United States Patent [19]

Steffen

[11] Patent Number: 4,504,390

[45] Date of Patent: Mar. 12, 1985

[54] SELECTABLE FILTER ASSEMBLY

[76] Inventor: Peter Steffen, Kirchenstrasse 80, 6632 Saarwellingen, Fed. Rep. of Germany

[21] Appl. No.: 515,099

[22] Filed: Jul. 19, 1983

[30] Foreign Application Priority Data

Jul. 20, 1982 [DE] Fed. Rep. of Germany ....... 3227059

[51] Int. Cl.³ .............................................. B01D 35/12
[52] U.S. Cl. ................................ 210/333.1; 210/341; 210/426; 210/428
[58] Field of Search ................ 210/142, 333.01, 333.1, 210/420, 424, 426, 428, 429, 106, 108, 446, 340, 341; 137/636.1, 625, 594

[56] References Cited

U.S. PATENT DOCUMENTS

| | | | |
|---|---|---|---|
| 1,078,939 | 11/1913 | Orgel | 210/424 |
| 1,742,669 | 1/1930 | Ross | 137/636.1 |
| 3,214,023 | 10/1965 | Donner | 210/232 |
| 3,221,888 | 12/1965 | Muller | 210/340 |
| 3,870,636 | 3/1975 | Schettler | 210/424 |
| 4,259,097 | 3/1981 | Patel et al. | 210/323.2 |
| 4,291,020 | 6/1981 | Meter | 210/424 |
| 4,341,642 | 7/1982 | Koepk et al. | 210/142 |

FOREIGN PATENT DOCUMENTS

| | | | |
|---|---|---|---|
| 598399 | 5/1960 | Canada | 210/108 |
| 813681 | 5/1969 | Canada | 210/333.1 |
| 583659 | 8/1933 | Fed. Rep. of Germany | 210/168 |
| 724530 | 8/1942 | Fed. Rep. of Germany | 210/333.1 |
| 45-34915 | of 1970 | Japan | 210/108 |
| 384595 | 2/1965 | Switzerland | 210/108 |
| 513460 | 4/1938 | United Kingdom . | |
| 511891 | 8/1938 | United Kingdom . | |
| 822322 | 10/1959 | United Kingdom . | |
| 915532 | 1/1963 | United Kingdom . | |
| 955278 | 4/1964 | United Kingdom . | |
| 984282 | 2/1965 | United Kingdom . | |
| 1146529 | 3/1969 | United Kingdom . | |
| 1502381 | 3/1978 | United Kingdom . | |

OTHER PUBLICATIONS

Brochure: "CONFLOW", pub. by Krampe & Co. Maschinenfabrik, Hattingen (Ruhr), BRD.

Primary Examiner—Barry S. Richman
Assistant Examiner—Titus B. Ledbetter, Jr.
Attorney, Agent, or Firm—Walter C. Farley

[57] ABSTRACT

A filter arrangement has two hollow, coaxial, cylindrical filter elements, one of which is closed at one end and the other of which is connected to a clean fluid outlet. The outsides of the filter elements are separated from each other by an intermediate ring. A three-way valve is operable by an operating member to connect an inlet for the raw fluid to either or both of first and second filter elements. A control member operates valves for opening and closing an outlet for dirty fluid is operated at the same time with the three-way valve, dependent on its position. Both filter elements can be used simultaneously for filtering and also flow can be reversed through either filter element.

3 Claims, 5 Drawing Figures

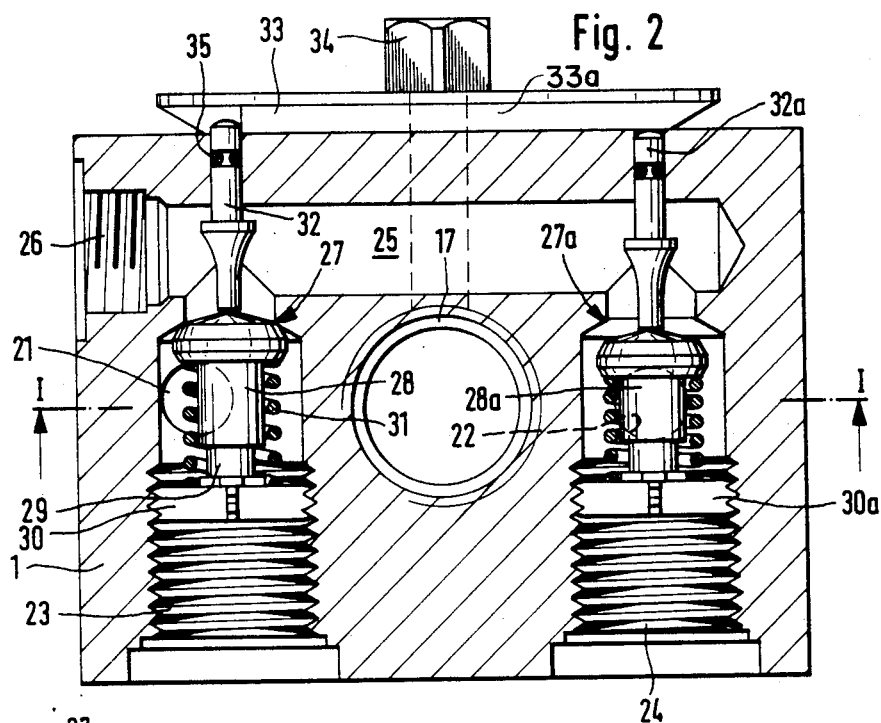
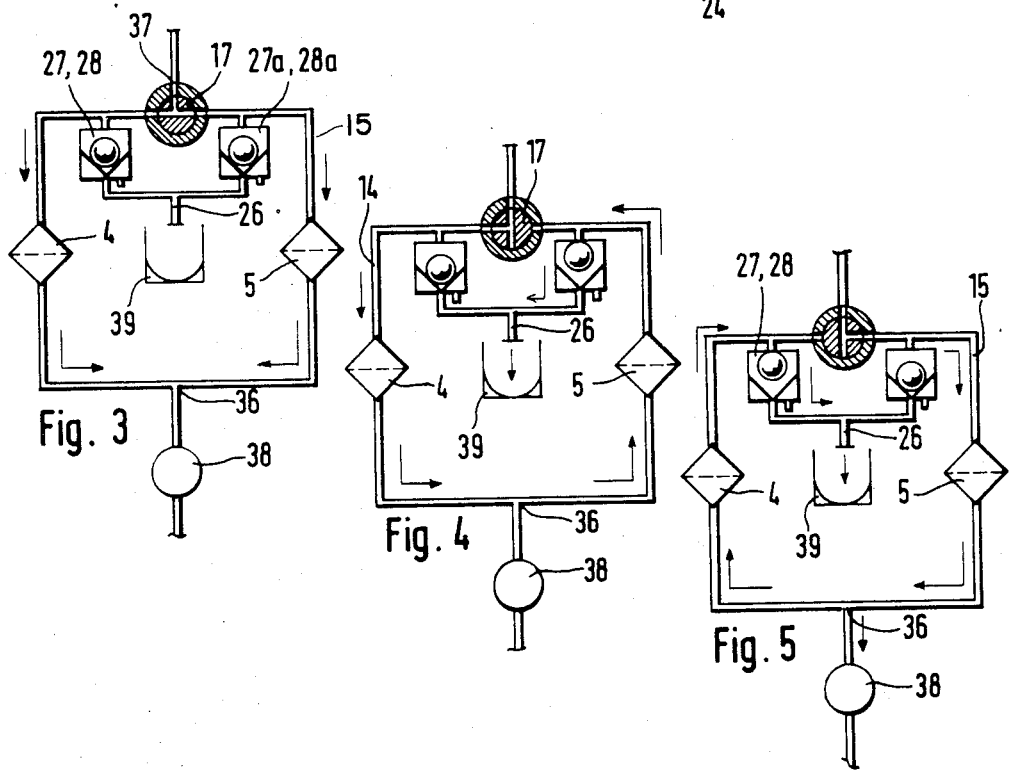

4,504,390

SELECTABLE FILTER ASSEMBLY

This invention relates to a filter assembly having two filter elements and a valve arrangement which permits selecting the direction of fluid flow through the elements.

BACKGROUND OF THE INVENTION

In a known filter arrangement of the type with which the invention is concerned, a control member is formed as a two-way valve or cock and the conduits are arranged so that only one of the filter elements is used for filtering and the other of the filter elements serves for reversing the flow through the first filter element, the flow through the other filter element not being reversible.

BRIEF DESCRIPTION OF THE INVENTION

An object of the present invention is to provide a filter assembly having two elements wherein both filter elements can be used at the same time for filtering and, in addition, it is possible to reverse the flow through either filter element for cleaning purposes.

Briefly described, the invention comprises a filter assembly of the type having a housing, two filter elements in the housing, an inlet connectable to a source of raw fluid to be filtered, a clean fluid outlet connected to a utilization device and a dirty fluid outlet, the assembly comprising a three-way valve connected to said inlet, conduit means for selectively interconnecting said valve with first sides of each of said filter elements and said clean fluid outlet with the second sides of said filter elements, said three-way valve being movable to selectively interconnect said inlet with the first sides of either one of said filter elements or both concurrently, second and third valve means connected to said conduit means on opposite sides of said three-way valve and to said dirty fluid outlet, and mechanical operator means connected to move said three-way valve and to individually open one of said second and third valve means when said three-way valve is moved to interconnect said inlet with one of said filter elements.

As will be described, the second and third valve means include mechanically operative valve members which, during normal filter operation, are both closed so that the flow passes from the outside to the inside through both cylindrical filter elements. When the flow is reversed through one of the filter elements and the other filter element is used to perform the filtering function, one of the mechanically operable valves is closed and when the flow is to be reversed through the other filter element, the other valve is closed. Thus, with this arrangement, it is possible to select the filter through which flow is to be reversed and through which the filtering action is to take place.

In order that the manner in which the foregoing and other objects are attained in accordance with the invention can be understood in detail, particularly advantageous embodiments thereof will be described with reference to the accompanying drawings, which form a part of this specification, and wherein:

FIG. 2 is a top plan view, in section, along line II—II of FIG. 1; and

FIGS. 3, 4 and 5 are schematic fluid flow diagrams showing three possible operating conditions of the apparatus of FIGS. 1 and 2.

Figure 1:
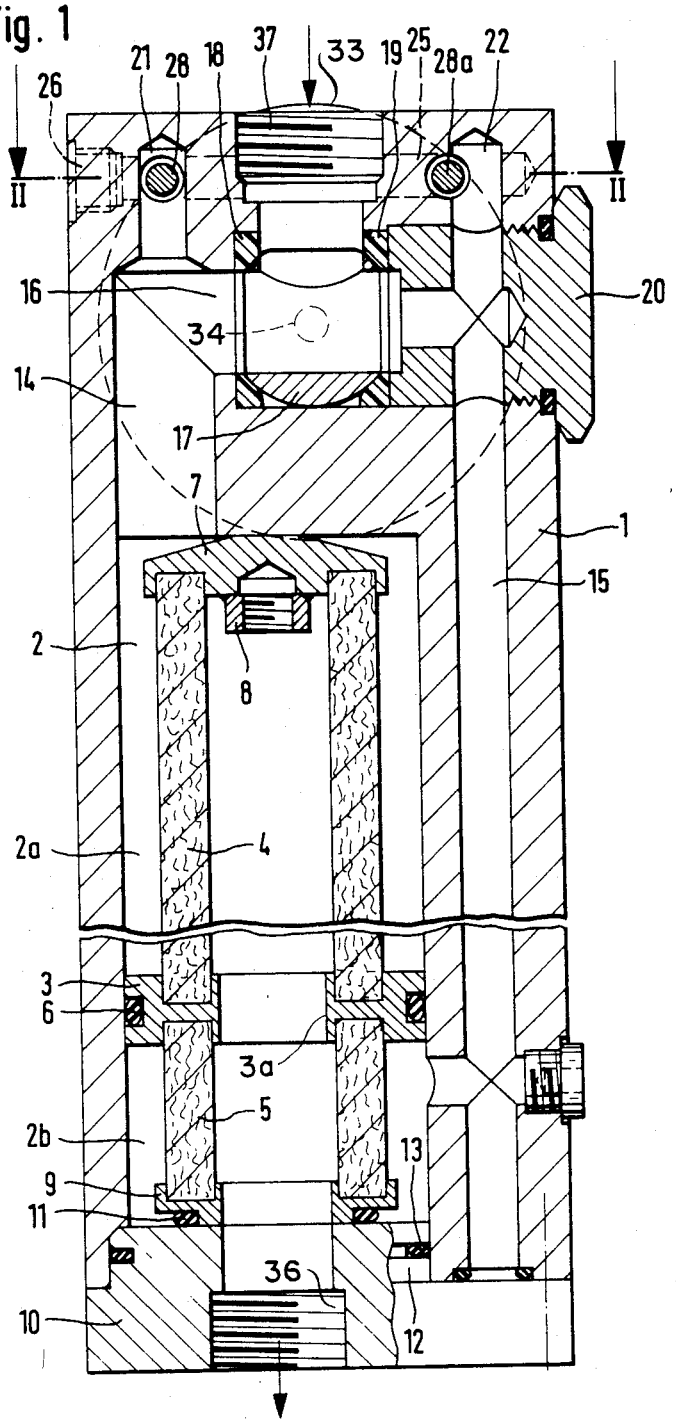
FIG. 1 is a side elevation, in section, of a filter arrangement in accordance with the invention along line I—I of FIG. 2.

As shown in FIG. 1, the assembly includes a filter housing 1 having a cylindrically shaped filter chamber 2 which receives two filter elements 4 and 5. The filter elements are coaxially mounted within the chamber and are separated by a mounting ring 3 which is intermediate the filter elements and which form a wall separating the outer regions of the elements from each other. The filter elements themselves are hollow, cylindrical elements which have substantially equal inner and outer diameters. The intermediate ring 3 has a central opening 3a which permits the interior volumes of the elements to communicate. The periphery of the ring fits against the inside wall of the filter chamber 2 and is sealed in fluid-tight relationship therewith by means of a sealing ring 6. That portion of the chamber 2 which contains filter element 4 is identified as 2a and the portion of the chamber which contains element 5 is identified as 2b. At the top of filter element 4 is a hood or cap 7 which abuts the upper end of chamber 2 and at the inside of which is a nut 8 welded thereto. At the end of filter element 5 opposite the ring 3, element 5 is supported on a supporting ring 9 which rests on a cover 10 which is inserted into the lower end of the housing and is releasably attached to the housing by screws. A sealing ring 11 surrounds supporting ring 9 to provide a seal between the supporting ring and cover 10. Cover 10 is provided with an inwardly extending projection 12 which extends into the lower end of chamber 2, the junction between the protrusion and the chamber being sealed by a sealing ring 13.

At the upper end of chamber 2a is a channel 14 which leads into portion 2a of the chamber and is in parallel therewith. On the opposite side of the housing is a channel 15 which extends parallel with channel 14, the lower end of channel 15 being provided with an opening into portion 2b of the chamber. Channels 14 and 15 are interconnected at the upper end of the housing by a cross-channel 16 which is shaped to receive a rotatable valve member 17 which forms a three-way valve, the valve member being disposed between sealing plates 18 and 19. Sealing plate 18 is supported by a shoulder in cross-channel 16, and plate 19 is held in by a hollow screw 20 which is threaded into the side of the housing at the end of channel 16. Channel 15 is connected with channel 16 by perpendicular bores through screw 20.

On both sides of the valve member 17 forming the three-way valve, blind bores 21 and 22 extend upwardly. Blind bore 21 is disposed coaxially with channel 14 and bore 22 is coaxial with channel 15. Again, bore 22 is connected to cross-channel 16 by an opening through screw 20. Blind bore 21 leads into a connecting channel 23 (FIG. 2) and bore 22 leads into a connecting channel 24. Connecting channels 23 and 24 lead into a cross-channel 25 which is parallel with channel 16 and which terminates at a dirty fluid outlet 26.

In connection channel 23 is a valve seat 27 which cooperates with a valve member 28 which is coaxially movable relative to channel 23. This valve member is guided on a shaft 29 of a square holding screw 30 which is threaded into connecting channel 23. A valve spring 31 is clamped between the holding screw 30 and valve member 28 to urge the valve member 28 toward its valve seat 27. An actuating rod 32 extends away from the other side of valve member 28 and is guided in a guide bore through the side of the housing, the bore being coaxial with connecting channel 23, the rod 32 extending beyond the face of the filter housing when the valve member is in its closed position. On the outside of the housing is a control disc 33 which has an axially facing cam surface 33a, the disc being rotatably mounted on a control shaft 34 which can be operated with a conventional tool to turn the rotatable valve member 17 to any one of its three positions. Cam surface 33a is in the form of a protrusion which presses rod 32 into the housing against the action of spring 31 when the cam surface is aligned with the end of the rod. When the cam surface is moved away from the rod, spring 31 urges the rod toward the position shown in FIG. 2 in which the valve is closed. Rod 32 is provided with an annular groove receiving a sealing ring 35 to form a fluid tight seal between the rod and the housing. The other end of channel 23 is closed by means of a sealing screw, not shown.

In a similar fashion, channel 24 includes a controllable valve 27a, 28a which is constructed and operated in a manner similar to valve 27, 28 and has a control rod 32a. Valve 27a, 28a is shown in FIG. 2 in its open state.

Referring again to FIG. 1, it will be recognized that cover 10 is provided with an outlet for clean fluid which communicates with the interior spaces of the two filter elements 4 and 5. At the other end of the filter assembly is an inlet 37 for the raw fluid which is connected to the rotatable valve 17.

FIGS. 3, 4 and 5 show the various operating conditions of the assembly thus far described and also schematically illustrate a side-by-side arrangement of filter elements. FIG. 3 shows the apparatus in the condition generally illustrated in FIG. 1 in which the inlet is connected by valve 17 with both channels 14 and 15 so that the fluid passes to the outsides of filter elements 4 and 5, the interior volumes of which are connected to the outlet 36 for the clean fluid which is then delivered to a utilization device 38 schematically shown in FIG. 3. Valves 27, 28 and 27a, 28a are both closed under these circumstances so that no fluid passes through outlet 26 which leads to a reservoir 39 which is provided to receive dirty fluid. In this position of the valve 17, the raw fluid delivered through conduit 37 is filtered by both of the filter elements.

FIG. 4 illustrates the condition in which valve 17 is rotated 90° counterclockwise as viewed in both FIG. 4 and FIG. 1. Under these conditions, a connection still exists between inlet 37 and channel 14. However, there is no connection with channel 15. Thus, all of the raw fluid delivered through inlet 37 flows directly to filter element 4. Because of the normal back pressure produced by the presence of the utilization device, part of the clean fluid flows from the inside of filter element 5 through that filter to the outside so that the flow through this filter element is reversed. The reversed fluid flow is carried away through conduit 15 and through the opened valve assembly 27a, 28a, as also shown in FIG. 2, and to the outlet 26 leading to reservoir 39.

In the circumstance shown in FIG. 5, valve 17 is rotated 90° in the other direction with respect to FIG. 3, or 180° from FIG. 4, in which the raw fluid delivered through inlet 37 flows through filter element 5. Normal back pressure causes a portion of the clean fluid to be used for reversed flushing of filter element 4, the dirty fluid therefrom flowing through the now opened valve 27, 28 into supply container 39. Valve 27a, 28a is closed.

While one advantageous embodiment has been chosen to illustrate the invention, it will be understood by those skilled in the art that various changes and modifications can be made therein without departing from the scope of the invention as defined in the appended claims.

What is claimed is:

1. A filter assembly comprising
    a housing having a filter chamber, an inlet connectable to a source of raw fluid to be filtered and an outlet for dirty liquid;
    first and second filter elements coaxially mounted in said chamber, each of said filter elements having first and second sides;
    a mounting wall extending across said chamber between the adjacent proximal ends of said filter elements, said wall having an opening to permit communication between first sides of said elements and a solid portion to isolate the second sides of said elements from each other;
    a filter cap closing the distal end of said first filter element;
    a cover closing the end of said chamber adjacent the distal end of said second filter element, said cover having a clean fluid outlet connectable to a utilization device;
    a first channel in said housing;
    a three-way valve mounted in said first channel and connected to said inlet, said three-way valve including a rotatable valve member and first and second sealing rings on opposite sides of said valve member;
    a support shoulder formed in said first channel abutting one of said sealing rings;
    a hollow screw engaging the other of said sealing rings;
    second and third channels in said housing, said second channel extending between one end of said first channel and the portion of said chamber on one side of said mounting wall and said third channel extending between the other end of said first channel and the portion of said chamber on the other side of said mounting wall;
    second and third valves connected to said dirty fluid outlet and to opposite sides, respectively, of said three-way valve, each of said second and third valves having a valve seat, a valve member and a stem attached to the valve member; and
    mechanical operation means connected for moving said three-way valve and for individually opening one of said second and third valves when said three-way valve is moved to interconnect said inlet with one of said filter elements, said mechanical operation means including a control plate coupled to said rotatable valve member and having an axially facing cam surface positioned to move said stems.

2. An assembly according to claim 1 wherein said rotatable valve member of said three-way valve has a central axis;
    each stem of said second and third valves extends parallel with the axis of said three-way valve.

3. An assembly according to claim 1 wherein said chamber is a cylindrical chamber and wherein said filter elements are cylindrical elements coaxially mounted in said chamber spaced from the chamber wall.

* * * * *